United States Patent
Qiu et al.

(10) Patent No.: US 11,681,509 B2
(45) Date of Patent: Jun. 20, 2023

(54) SMART CONTRACT PROCESSING METHOD AND SYSTEM, COMPUTER DEVICE, AND READABLE STORAGE MEDIUM

(71) Applicant: HANGZHOU QULIAN TECHNOLOGY CO., LTD., Hangzhou (CN)

(72) Inventors: Weiwei Qiu, Hangzhou (CN); Wei Li, Hangzhou (CN); Liang Cai, Hangzhou (CN); Shuai Zhang, Hangzhou (CN); Dingwen Zhang, Hangzhou (CN)

(73) Assignee: HANGZHOU QULIAN TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/676,155

(22) Filed: Feb. 20, 2022

(65) Prior Publication Data
US 2022/0171607 A1 Jun. 2, 2022

Related U.S. Application Data

(63) Continuation of application No. PCT/CN2020/110367, filed on Aug. 21, 2020.

(30) Foreign Application Priority Data

Aug. 21, 2019 (CN) .......................... 201910772369.7

(51) Int. Cl.
*G06F 9/44* (2018.01)
*G06F 8/41* (2018.01)
*G06F 11/34* (2006.01)

(52) U.S. Cl.
CPC .......... *G06F 8/425* (2013.01); *G06F 11/3409* (2013.01)

(58) Field of Classification Search
None
See application file for complete search history.

(56) References Cited

U.S. PATENT DOCUMENTS

| 9,921,813 B2 * | 3/2018 | Gorissen | ................. G06F 8/425 |
| 11,113,042 B2 * | 9/2021 | Farivar | ..................... G06F 8/44 |

(Continued)

FOREIGN PATENT DOCUMENTS

| CN | 105786715 A | 7/2016 |
| CN | 107358099 A | 11/2017 |

(Continued)

OTHER PUBLICATIONS

Hu, Wen et al. "Study on Optimized Template Generation Method for Smart Contract", Journal of Harbin University of Commerce(Natural Sciences Edition), vol. 1, No. 35, Feb. 28, 2019, p. 1, col. 1-p. 6, left-hand column, para. 1.

(Continued)

*Primary Examiner* — Qamrun Nahar

(57) ABSTRACT

The present disclosure relates to a smart contract processing method and a system, and a readable storage medium. By segmenting a function requiring performance analysis, establishing a symbol calculation model and calculating a GAS consumption formula, and performing further optimization, a GAS value consumed by the execution of a program containing a polynomial cycle can be automatically calculated, or a GAS value consumed by the execution of a program containing a non-linear cycle can be calculated with minimal human assistance, so as to reflect the performance thereof.

20 Claims, 3 Drawing Sheets

(56) References Cited

U.S. PATENT DOCUMENTS

2016/0202955 A1 7/2016 Vanags
2018/0089758 A1* 3/2018 Stradling ............... G06Q 40/04

FOREIGN PATENT DOCUMENTS

| CN | 108628600 A | 10/2018 |
| CN | 109710385 A | 5/2019 |
| CN | 110543407 A | 12/2019 |

OTHER PUBLICATIONS

International Search Report of PCT/CN2020/110367 dated Nov. 26, 2020 QN.

* cited by examiner

SMART CONTRACT PROCESSING METHOD AND SYSTEM, COMPUTER DEVICE, AND READABLE STORAGE MEDIUM

CROSS-REFERENCE TO RELATED APPLICATIONS

This application is a continuation of international application No. PCT/CN2020/110367 filed on Aug. 21, 2020, which claims all benefits accruing from China Patent Application No. 201910772369.7, filed on Aug. 21, 2019, titled "STATIC ANALYSIS METHOD FOR PERFORMANCE OF SOLIDITY SMART CONTRACT" in the China National Intellectual Property Administration, both of which are hereby incorporated by reference.

TECHNICAL FIELD

The present disclosure generally relates to the technical field of a smart contract, and in particular, to a smart contract processing method and a system, a computer device, and a readable storage medium.

BACKGROUND

A smart contract is trusted computer codes which are executable in a blockchain, and Solidity is a high-level computer language for writing the smart contract. A Solidity smart contract is executed on an Ethereum virtual machine (EVM) and deployed on an Ethereum platform. A special execution mechanism of the Solidity smart contract allows a developer to focus on consuming a GAS (GNU Assembler) cost based on complexity for each transaction that invokes a Solidity smart contract, in addition to focusing on code functionality and security. Therefore, the more complex the Solidity smart contract is, the more expensive the cost will be. How to develop a Solidity smart contract that meets needs and inexpensive is a problem for the developer. In fact, a Solidity smart contract complexity analysis is really a performance analysis. At present, the main methods rely on judgment based on experience or dynamic execution to check an actual GAS consumption. A static performance analysis method is not mature, and the difficulty lies in a determination of a cycle invariant and a termination condition. No mature static analysis method that can accurately calculate the GAS consumption of the Solidity smart contract has been proposed in this field.

SUMMARY

According to various embodiments of the present disclosure, a static analysis method for performance of a Solidity smart contract is provided. The analysis method includes the following steps: (1) inputting a Solidity smart contract, and segmenting a performance analyzing function of the Solidity smart contract, so as to extract a complete program segment; (2) establishing a symbol calculation model according to the complete program segment in step (1); and (3) calculating a GAS consumption formula according to the symbol calculation model in step (2), and outputting a simplified GAS formula.

In an embodiment of the present disclosure, the step (1) further includes the following sub-steps: (1.1) performing a syntax analysis of the input Solidity smart contract and establishing a syntax tree; (1.2) creating a Solidity system dependency diagram according to the syntax tree; and (1.3) segmenting the Solidity system dependency diagram using a segmenting algorithm to extract the complete program segment.

In an embodiment of the present disclosure, the step (2) is specified as follows: (2.1) converting the complete program segment into an execution code (or an assembly instruction) program for an EVM according to a compilation principle of a Solidity compiler; and (2.2) converting the execution code program into a symbol calculation expression for GAS accumulation according to a GAS size comparison table consumed by the execution code program, and generating a cycle invariant; generating the cycle invariant automatically for a case that the execution code program contains a polynomial cycle, and manually assisting in adding a cycle invariant for a case that the execution code program contains a non-linear cycle.

In an embodiment of the present disclosure, the step (3) is specified as follows: (3.1) for a case that the execution code program contains a cycle, expressing a cycle assignment statement as a system of first order constant coefficient difference equations for a program variable with respect to a number of cycles, obtaining a closed form solution of the system of first order constant coefficient difference equations, substituting the closed form solution into a cycle condition, and obtaining an expression for the calculation of cycle GAS consumption with respect to the number of cycles; for a case that the execution code program contains logical control, converting a logical control statement into a homogeneous polynomial containing symbols of relevant variables as a GAS consumption expression; and (3.2) accumulating in turn all GAS consumption expressions in all program segments according to a symbol calculation method to acquire a final GAS consumption formula, and outputting a simplified GAS formula.

In an embodiment of the present disclosure, the symbol calculation method is specified as follows: (4.1) inputting a polynomial cycle program P, a number m of program variables, and an upper bound U on a number of power of polynomial invariants; (4.2) initializing LoopInv to be empty; (4.3) representing the polynomial cycle program P by a polynomial variation system T, wherein T consists of V, L, Y, l0 and O, V represents a set of variables, L represents a set of finite positions, Y represents a set of state variations, l0 represents an initial position, and O represents an initial condition; (4.4) acquiring a set S of sample points according to the polynomial cycle program P in step (4.3); (4.5) calculating, by means of a Boyer-Moore (BM) algorithm, a Grobner basis $I(S)=<p1, p2, \ldots, ps>$ of the set S of sample points with elimination ideal under a subdivision dictionary order, and calculating the lowest number of all polynomials $p1, p2, \ldots, ps$ in $I(S)$ with $pi=0$ as a candidate invariant of the polynomial cycle program P, wherein $i=1, 2, \ldots, s$; (4.6) verifying the candidate invariant: when $pi(V)|pi(V')$ is set up, assigning the LoopInv to LoopInv^pi, wherein V' represents the set of variables after the variation; and (4.7) repeating the step (4.6) until $i>s$, and generating a cycle invariant of the polynomial cycle program P.

According to various embodiments of the present disclosure, a smart contract processing method is further provided. The processing method includes: acquiring a smart contract, segmenting a performance analyzing function of the smart contract, so as to extract a complete program segment; establishing a symbol calculation model according to the program segment; and acquiring a GAS consumption formula according to the symbol calculation model, simplifying and outputting same.

In an embodiment of the present disclosure, the segmenting the performance analyzing function of the smart contract, so as to extract the complete program segment includes the following steps: performing a syntax analysis of the smart contract and establishing a syntax tree; creating a Solidity system dependency diagram according to the syntax tree; and segmenting the Solidity system dependency diagram using a segmenting algorithm to extract the complete program segment.

In an embodiment of the present disclosure, the establishing a symbol calculation model according to the program segment comprises: converting the program segment into an execution code program for an EVM according to a compilation principle of a Solidity compiler; converting the execution code program into a symbol calculation expression for GAS accumulation according to the GAS consumed by the execution code program and a GAS size comparison table, and generating a cycle invariant; and generating the cycle invariant automatically for a case that the execution code program contains a polynomial cycle, and manually assisting in adding a cycle invariant for a case that the execution code program contains a non-linear cycle.

In an embodiment of the present disclosure, the acquiring the GAS consumption formula according to the symbol calculation model, simplifying and outputting same includes: for a case that the execution code program contains a cycle, expressing a cycle assignment statement as a system of first order constant coefficient difference equations for a program variable with respect to a number of cycles, obtaining a closed form solution of the system of first order constant coefficient difference equations, substituting the closed form solution into a cycle condition, and obtaining an expression for the calculation of cycle GAS consumption with respect to the number of cycles; for a case that the execution code program contains logical control, converting a logical control statement into a homogeneous polynomial containing symbols of relevant variables as a GAS consumption expression; and accumulating in turn all GAS consumption expressions in all program segments according to a symbol calculation method to acquire a final GAS consumption formula, and simplifying and outputting the GAS consumption formula.

In an embodiment of the present disclosure, the symbol calculation method includes the following steps: inputting a polynomial cycle program P, a number m of program variables, and an upper bound U on a number of power of polynomial invariants; initializing LoopInv to be empty; representing the polynomial cycle program P by a polynomial variation system T, wherein T consists of V, L, Y, l0 and O, V represents a set of variables, L represents a set of finite positions, Y represents a set of state variations, l0 represents an initial position, and O represents an initial condition; acquiring a set S of sample points according to the polynomial variation system T; calculating, by means of a BM algorithm, the Grobner basis $I(S)=\langle p1, p2, \ldots, ps\rangle$ of the set S of sample points with elimination ideal under a subdivision dictionary order, and calculating the lowest number of all polynomials $p1, p2, \ldots, ps$ in $I(S)$ with $pi=0$ as a candidate invariant of the polynomial cycle program P, wherein $i=1, 2, \ldots, s$; verifying the candidate invariant: when $pi(V)|pi(V')$ is set up, assigning the LoopInv to LoopInv$\hat{}$pi, wherein V' represents the set of variables after the variation; and repeating the step of verifying the candidate invariant, iterating over values of i until $i>s$, and generating a cycle invariant of the polynomial cycle program P according to the LoopInv.

According to various embodiments of the present disclosure, a smart contract processing system is further provided. The processing system includes: a function segmenting module configured for acquiring a smart contract, segmenting a performance analyzing function of the smart contract, so as to extract a complete program segment; a model establishing module configured for establishing a symbol calculation model according to the program segment; and a formula acquiring module configured for acquiring a GAS consumption formula according to the symbol calculation model, simplifying and outputting same.

According to various embodiments of the present disclosure, a computer device is further provided. The computer device includes a memory and a processor. The memory stores a computer program, which is executed by the processor to implement the steps of the smart contract processing method above.

According to various embodiments of the present disclosure, a computer-readable storage medium is further provided. The computer-readable storage medium has stored a computer program, which is executed by a processor to implement the steps of the smart contract processing method above.

BRIEF DESCRIPTION OF THE DRAWINGS

To describe and illustrate embodiments and/or examples of the present disclosure made public here better, reference may be made to one or more of the figures. The additional details or examples used to describe the figures should not be construed as limiting the scope of any of the present disclosure, the embodiments and/or examples currently described, and the best model of the present disclosure as currently understood.

DETAILED DESCRIPTION OF THE EMBODIMENTS

In order to facilitate the understanding of the present disclosure and make the above purposes, features and advantages of the present disclosure more obvious and understandable, the following is a detailed explanation of the specific implementation of the present disclosure combined with the attached drawings. Many details are explained in the description below in order to fully understand the present disclosure, and a better embodiment to implement the present disclosure is given in the attached drawings. However, the present disclosure can be implemented in many different forms and is not limited to the implementation described herein. Rather, the purpose of providing these embodiments is to provide a more thorough understanding of the present disclosure. The present disclosure can be performed in many other ways other than those described herein, and similar improvements can be made by a person skilled in the art without violating the meaning of the present disclosure, so the present disclosure is not limited by specific embodiments disclosed below.

Furthermore, the terms "first" and "second" are used for a descriptive purpose only and are not to be understood to indicate or imply relative importance or to indicate implicitly a number of indicated technical features. Thus, features that are qualified as "first" or "second" may include, explicitly or implicitly, at least one of these features. In the description of the present disclosure, "multiple" means at least two, e.g., two, three, etc., unless otherwise expressly and specifically qualified. In the description of the present disclosure, "several" means at least one, e.g. one, two, etc., unless otherwise expressly and specifically qualified.

Unless otherwise defined, all technical and scientific terms used herein have the same meaning as those normally understood by a person skilled in the art of the present disclosure. The terms used herein are intended only to describe the specific embodiments and are not intended to limit the present disclosure. The term "and/or" used herein includes any and all combinations of one or more related listed items.

Figure 1:
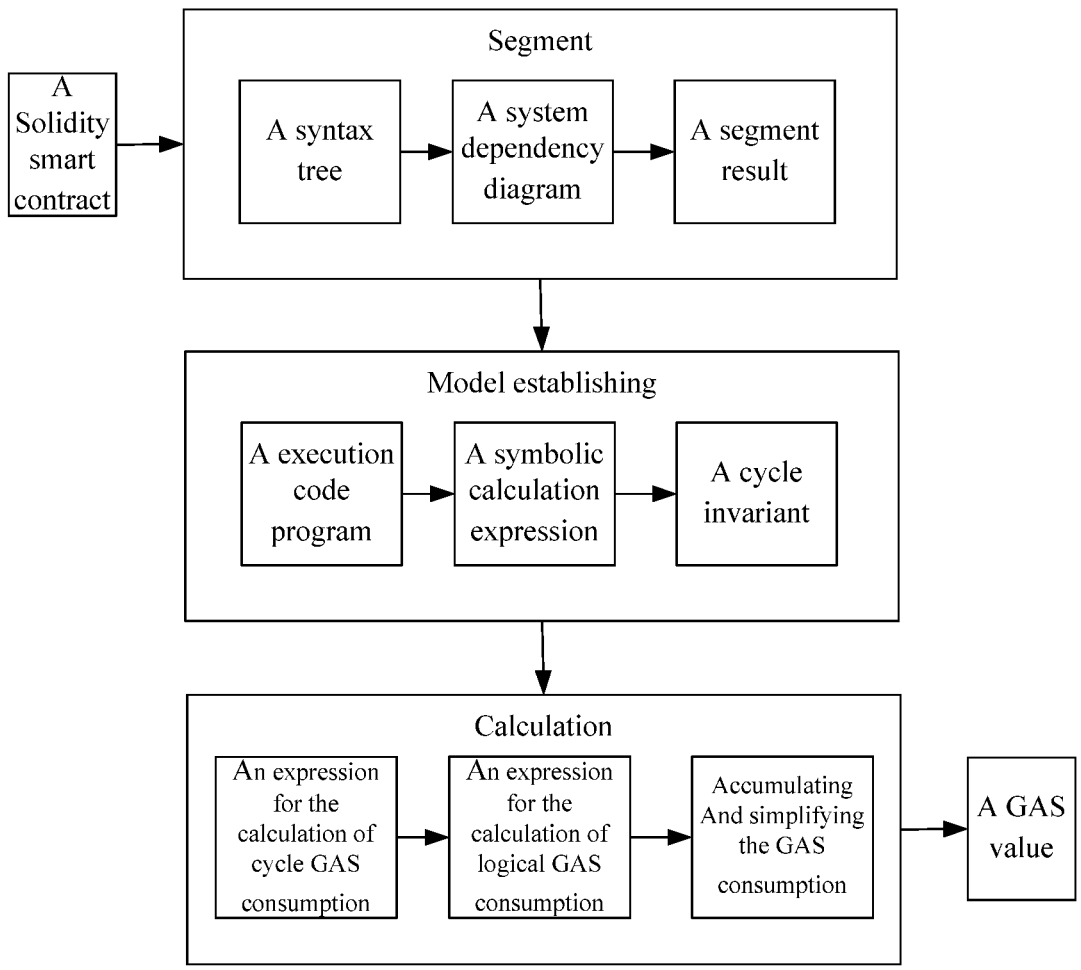
FIG. 1 is a flowchart diagram of a static analysis for performance of a Solidity smart contract in an embodiment of the present disclosure.

FIG. 1 is a flowchart diagram of a static analysis for performance of a Solidity smart contract in an embodiment of the present disclosure. As shown in FIG. 1, the flowchart of the static analysis for performance of the Solidity smart contract is as follows: (1) a developer inputs the Solidity smart contract, which will need a manually added cycle invariant if the Solidity smart contract contains a non-linear cycle process. A grammatical structure of the cycle invariant consists of a cycle invariant label and an invariant, and the invariant is an equation held in a cycle iteration process. A performance analysis function of the Solidity smart contract is segmented. When the segment is performed, the input Solidity smart contract is syntactically analyzed to establish a syntax tree, then the Solidity system dependency diagram is created, and finally the Solidity system dependency diagram is segmented according to a segment algorithm to extract a complete program segment.

(2) A model is established for the segment result of the Solidity smart contract. During the model establishing, firstly, a complete program segment is converted into an execution code (or an assembly instruction) program for an EVM according to a compilation principle of a Solidity compiler; then the execution code program is converted into a symbol calculation expression for GAS accumulation according to a GAS size comparison table consumed by a Solidity execution code program, and generating a cycle invariant. For a case that the execution code program contains a polynomial cycle, the cycle invariant is generated automatically. For a case that the execution code program contains a non-linear cycle, a cycle invariant is added manually.

(3) A calculation is performed on a static analysis model of the Solidity smart contract. For a case that the execution code program contains a cycle, a cycle assignment statement is expressed as a system of first order constant coefficient difference equations for a program variable with respect to a number of cycles, a closed form solution of the system of first order constant coefficient difference equations is obtained, the closed form solution is substituted into a cycle condition to obtain an expression for the calculation of cycle GAS consumption with respect to the number of cycles. For a case that the execution code program contains logical control, a logical control statement is converted into a homogeneous polynomial containing symbols of relevant variables as a GAS consumption expression. All GAS consumption expressions in all program segments are accumulated in turn according to a symbol calculation method to acquire a final GAS consumption formula, and then a simplified GAS consumption expression of the Solidity smart contract is acquired. The GAS consumption expression is typically a formula with symbol variables associated with input parameters, local variables, and a number of cycles in the Solidity smart contract. The developer can analyze key parameters that affect performance according to the expression, and optimize performance by controlling these parameters or changing algorithms.

Figure 2:
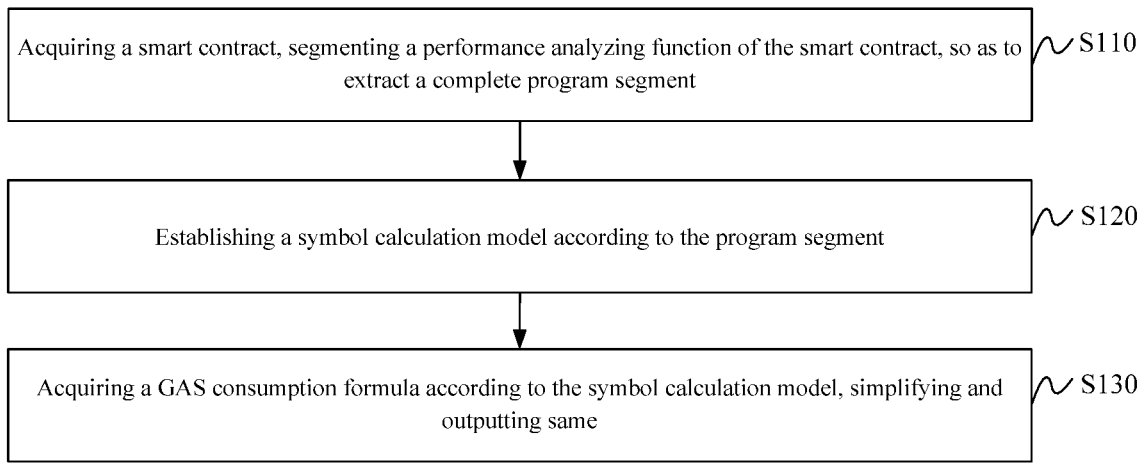
FIG. 2 is a flowchart diagram of a smart contract processing method in an embodiment of the present disclosure.

Furthermore, the Solidity is a high-level computer language for writing a smart contract. Smart contracts can also be written in other programming languages, as is the case with the present disclosure. Therefore, for a smart contract, as shown in FIG. 2, the following schemes can be adopted to realize the processing of the smart contract: at step 110, acquiring a smart contract, segmenting a performance analyzing function of the smart contract, so as to extract a complete program segment; at step 120, establishing a symbol calculation model according to the program segment; at step 130, acquiring a GAS consumption formula according to the symbol calculation model, simplifying and outputting same.

The segmenting the performance analyzing function of the smart contract, so as to extract the complete program segment includes the following steps: performing a syntax analysis of the smart contract and establishing a syntax tree; creating a Solidity system dependency diagram according to the syntax tree; and segmenting the Solidity system dependency diagram using a segmenting algorithm to extract the complete program segment.

The establishing a symbol calculation model according to the program segment comprises: converting the program segment into an execution code program for an EVM according to a compilation principle of a Solidity compiler; converting the execution code program into a symbol calculation expression for GAS accumulation according to the GAS consumed by the execution code program and a GAS size comparison table, and generating a cycle invariant; and generating the cycle invariant automatically for a case that the execution code program contains a polynomial cycle, and manually assisting in adding a cycle invariant for a case that the execution code program contains a non-linear cycle.

The acquiring the GAS consumption formula according to the symbol calculation model, simplifying and outputting same comprises: for a case that the execution code program contains a cycle, expressing a cycle assignment statement as a system of first order constant coefficient difference equations for a program variable with respect to a number of cycles, obtaining a closed form solution of the system of first order constant coefficient difference equations, substituting the closed form solution into a cycle condition, and obtaining an expression for the calculation of cycle GAS consumption with respect to the number of cycles; for a case that the execution code program contains logical control, converting a logical control statement into a homogeneous polynomial containing symbols of relevant variables as a GAS consumption expression; and accumulating in turn all GAS consumption expressions in all program segments according to a symbol calculation method to acquire a final GAS consumption formula, and simplifying and outputting the GAS consumption formula.

Figure 3:
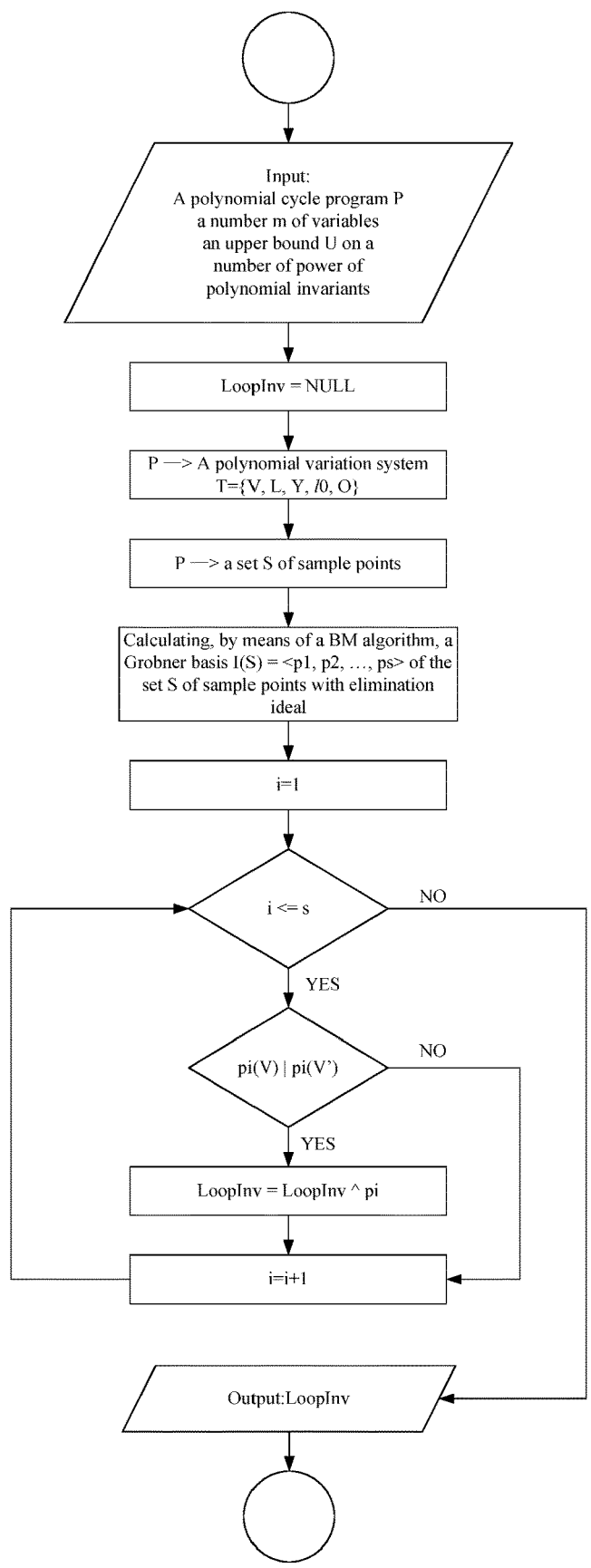
FIG. 3 is a diagram of a core algorithm of cycle procedure for the Solidity smart contract in an embodiment of the present disclosure.

According to the static analysis method for performance of the Solidity smart contract in the present disclosure, the symbol calculation method of a cycle program is an automatic generation of a cycle invariant, the flow of which is shown in FIG. 3. The symbol calculation method is based on a BM algorithm. For a polynomial variation system, a polynomial equation is calculated as a cyclic invariant of the polynomial variation system. For a given program P containing m variables, an upper bound U on a number of power of invariants which is expected to be generated is just given, a set S containing at most (d+m, m) sample points may be acquired according to a program P, and then a Grobner basis I(S) of the set S of sample points with elimination ideal can be calculated as a candidate invariant of the program. At the same time, a minimum number d of power of all polynomials in the I(S) may be acquired, which is used to determine whether the program P has a polynomial equality invariant lower than d, and the candidate invariant is verified by a divisible property of the polynomial, and finally the polynomial is generated as a cyclic invariant. The specific process of the symbol calculation method is as follows: (1) inputting a polynomial cycle program P, a number m of program variables, and an upper bound U on a number of power of polynomial invariants; (2) initializing LoopInv to be empty; (3) representing the polynomial cycle program P by a polynomial variation system T, T consisting of V, L, Y, l0 and O, V representing a set of variables, L representing a set of finite positions, Y representing a set of state variations, l0 representing an initial position, and O representing an initial condition; (4) acquiring a set S of sample points according to the polynomial cycle program P in step (3); (5) calculating, by means of a BM algorithm, the Grobner basis I(S)=<p1, p2, . . . , ps> of the set S of sample points with elimination ideal under a subdivision dictionary order, and calculating the lowest number of all polynomials p1, p2, . . . , ps in I(S) with pi=0 as a candidate invariant of the polynomial cycle program P, wherein i=1, 2, . . . , s; (6) verifying the candidate invariant: when pi(V)|pi(V') is set up, assigning the LoopInv to LoopInv^pi, wherein V' represents the set of variables after the variation; (7) repeating the step (6) until i>s, and generating a cycle invariant of the polynomial cycle program P.

The above algorithm requires that the upper bound U of power of the expected polynomial invariant is given, and no invariant template is preset. Because (d+m, m) unknown parameters will be generated for the polynomial template with preset number m of arguments and the number d of power when a template method is applied, it is difficult for such a constraint solving problem. In the algorithm, it is required to calculate at most (d+m, m) sample points, which is actually the number of unknown parameters in the template method. However, in the practical application of the algorithm, so many sample points are not needed. Moreover, compared with the template method which applies a quantifier elimination, an ideal Grobner basis of a polynomial, and double exponential time complexity such as a covariant semi-algebraic system to solve a constraint problem, it is more efficient for the BM algorithm based on a polynomial time complexity to calculate the candidate invariant.

The present disclosure has the following advantages: the static analysis method for performance of the Solidity smart contract is provided in the present disclosure that reflects the performance of the Solidity smart contract by automatically calculating a GAS value consumed by the execution of a program containing a polynomial cycle, or by calculating the GAS value consumed by the execution of a program containing a non-linear cycle with minimal manual assistance. A GAS consumption value calculated in the present disclosure is typically a formula with symbol variables associated with input parameters, local variables, and a number of cycles in the Solidity smart contract. Without the need to prepare complex test cases to run the smart contract, a developer can accurately calculate the GAS consumption formula and the performance of the smart contract can be quantitatively determined, thereby facilitating a determination of a circumstance where the smart contract reaches the GAS upper limit, an accurate optimization of the performance of the Solidity smart contract by the developer, and an accurate determination of an economics of the contract by project stakeholders, and having a significant effect on evaluating execution costs and benefits. In addition, the symbol calculation method for processing the cycle program related to the present disclosure has certain reference significance to the field.

Furthermore, for the smart contract processing method, the symbol calculation method mentioned above is also applicable, including the following steps: inputting a polynomial cycle program P, a number m of program variables, and an upper bound U on a number of power of polynomial invariants; initializing LoopInv to be empty; representing the polynomial cycle program P by a polynomial variation system T, wherein T consists of V, L, Y, l0 and O, V represents a set of variables, L represents a set of finite positions, Y represents a set of state variations, l0 represents an initial position, and O represents an initial condition; acquiring a set S of sample points according to the polynomial variation system T; calculating, by means of a BM algorithm, the Grobner basis I(S)=<p1, p2, . . . , ps> of the set S of sample points with elimination ideal under a subdivision dictionary order, and calculating the lowest number of all polynomials p1, p2, . . . , ps in I(S) with pi=0 as a candidate invariant of the polynomial cycle program P, wherein i=1, 2, . . . , s; verifying the candidate invariant: when pi(V)|pi(V') is set up, assigning the LoopInv to LoopInv^pi, wherein V' represents the set of variables after the variation; and repeating the step of verifying the candidate invariant, iterating over values of i until i>s, and generating a cycle invariant of the polynomial cycle program P according to the LoopInv.

Figure 4:
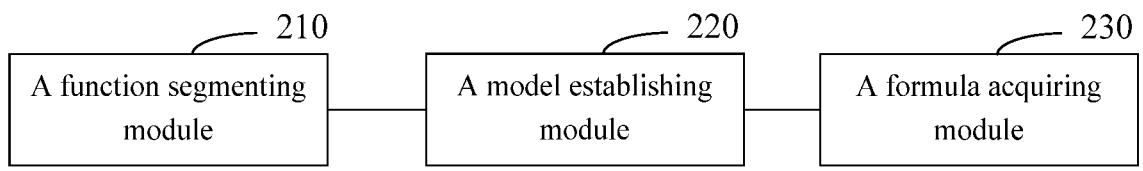
FIG. 4 is a schematic diagram of a smart contract processing system in an embodiment of the present disclosure.

In an embodiment, as shown in FIG. 4, a smart contract processing system is provided. The smart contract processing system includes: a function segmenting module 210, a model establishing module 220, and a formula acquiring module 230. The function segmenting module 210 is configured for acquiring a smart contract, segmenting a performance analyzing function of the smart contract, so as to extract a complete program segment. The model establishing module 220 is configured for establishing a symbol calculation model according to the program segment. The formula acquiring module 230 is configured for acquiring a GAS consumption formula according to the symbol calculation model, simplifying and outputting same.

In an embodiment, the function segmenting module 210 is further configured for performing a syntax analysis of the smart contract and establishing a syntax tree; creating a Solidity system dependency diagram according to the syntax tree; and segmenting the Solidity system dependency diagram using a segmenting algorithm to extract the complete program segment.

In an embodiment, the model establishing module 220 is further configured for converting the program segment into an execution code program for an EVM according to a compilation principle of a Solidity compiler; converting the execution code program into a symbol calculation expression for GAS accumulation according to the GAS consumed by the execution code program and a GAS size comparison table, and generating a cycle invariant; and generating the cycle invariant automatically for a case that the execution code program contains a polynomial cycle, and manually assisting in adding a cycle invariant for a case that the execution code program contains a non-linear cycle In an embodiment, the formula acquiring module 230 is further configured for expressing a cycle assignment statement as a system of first order constant coefficient difference equations for a program variable with respect to a number of cycles for a case that the execution code program contains a cycle, obtaining a closed form solution of the system of first order constant coefficient difference equations, substituting the closed form solution into a cycle condition, and obtaining an expression for the calculation of cycle GAS consumption with respect to the number of cycles; for a case that the execution code program contains logical control, converting a logical control statement into a homogeneous polynomial containing symbols of relevant variables as a GAS consumption expression; and accumulating in turn all GAS consumption expressions in all program segments according to the symbol calculation method to acquire a final GAS consumption formula, and simplifying and outputting the GAS consumption formula.

In an embodiment, the symbol calculation method includes the following steps: inputting a polynomial cycle program P, a number m of program variables, and an upper bound U on a number of power of polynomial invariants; initializing LoopInv to be empty; representing the polynomial cycle program P by a polynomial variation system T, wherein T consists of V, L, Y, l0 and O, V represents a set of variables, L represents a set of finite positions, Y represents a set of state variations, l0 represents an initial position, and O represents an initial condition; acquiring a set S of sample points according to the polynomial variation system T; calculating, by means of a BM algorithm, the Grobner basis $I(S)=<p1, p2, \ldots, ps>$ of the set S of sample points with elimination ideal under a subdivision dictionary order, and calculating the lowest number of all polynomials p1, p2, . . . , ps in I(S) with pi=0 as a candidate invariant of the polynomial cycle program P, wherein i=1, 2, . . . , s; verifying the candidate invariant: when pi(V)|pi(V') is set up, assigning the LoopInv to LoopInv^pi, wherein V' represents the set of variables after the variation; and repeating the step of verifying the candidate invariant, iterating over values of i until i>s, and generating a cycle invariant of the polynomial cycle program P according to the LoopInv.

For specific restrictions on the smart contract processing system, please refer to the above restrictions on smart contract processing methods, which will not be described here. All the modules in the smart contract processing system can be fully or partially realized by software, hardware and a combination thereof. The above modules can be embedded in or independent of a processor in a computer device in the form of hardware, or stored in a memory in the computer device in the form of software, so that the processor can call to perform operations corresponding to the above modules.

Figure 5:
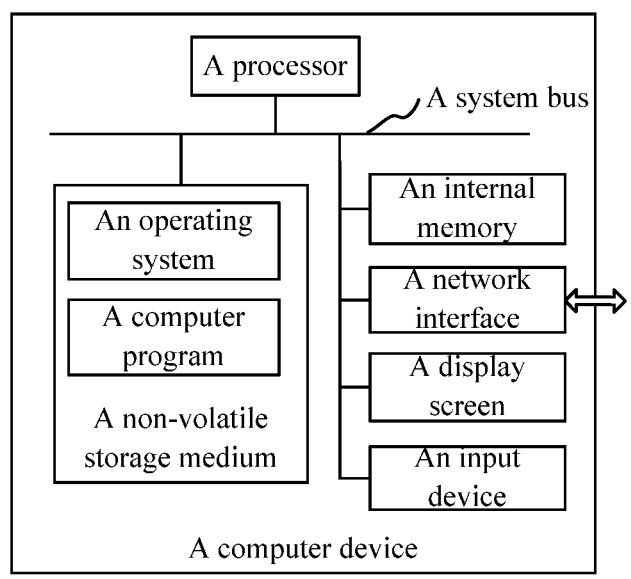
FIG. 5 is an internal schematic diagram of a computer device in an embodiment of the present disclosure.

In an embodiment, a computer device is provided, which may be a terminal, and its internal structure diagram may be shown in FIG. 5. The computer device includes a processor, a memory, a network interface, a display screen and an input device connected through a system bus. The processor of the computer device is configured to provide computing and control capabilities. The memory of the computer device includes a non-volatile storage medium and an internal memory. The non-volatile storage medium stores an operating system and a computer program. The internal memory provides an environment for the operation of the operating system and the computer program in the non-volatile storage medium. The network interface of the computer device is configured to communicate with an external terminal over a network connection. The computer program is executed by the processor to implement a smart contract processing method. The display screen of the computer equipment can be a liquid crystal display screen or an electronic ink display screen. The input device of the computer equipment can be a touch layer covered on the display screen, or a key, a track ball or a track pad set on the shell of the computer device, or an external keyboard, a track pad or a mouse, etc.

A person skilled in the art may understand that, a structure shown in FIG. 5 is only a part related to the scheme in the present disclosure, the structure block diagram does not limit the computer device on which the scheme in the present disclosure is applied, a specific computer device may include more or less than shown in the figure, or combination of some parts, or different decorations with parts.

In an embodiment, a computer device is provided. The computer device includes a memory and a processor. The memory stores a computer program, which is executed by the processor to implement the steps of the smart contract processing method above.

In an embodiment, a computer-readable storage medium is provided. The computer-readable storage medium has stored a computer program, which is executed by a processor to implement the steps of the smart contract processing method above.

The person skilled in the art can understand that all or part of the process in the method of the above embodiment can be accomplished by instructing the associated hardware by a computer program, which may be stored in a non-volatile computer readable storage medium. The computer program may include the process of each method in the above embodiments when executed. Any reference to a memory, a database or other medium used in each embodiment provided by the present disclosure may include at least one of a non-volatile memory and a volatile memory. The non-volatile memory may include a Read-Only Memory (ROM), a programmable ROM (PROM), an electrically programmable ROM (EPROM), an electrically erasable programmable ROM (EEPROM), or a flash memory. The volatile memory may include a Random Access Memory (RAM) or an external cache memory. As an illustration rather than a limitation, the RAM is available in a variety of forms, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchronous Link Dynamic Random Access Memory (SLDRAM), a Rambus Direct Random Access Memory (RDRAM), a Direct Rambus Dynamic Random Access Memory (DRDRAM), a Rambus Dynamic Random Access Memory (RDRAM), etc.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a plurality of variations and modifications may be made by those skilled in the art without departing from the spirit and scope of the disclosure. Therefore, the scope of the disclosure should be determined by the appended claims.

We claim:

1. A smart contract processing method, comprising the following steps:
   acquiring a smart contract, segmenting a performance analyzing function of the smart contract, so as to extract a complete program segment;
   establishing a symbol calculation model according to the program segment; and
   acquiring a GAS consumption formula according to the symbol calculation model, simplifying and outputting same.

2. The smart contract processing method of claim 1, wherein the segmenting the performance analyzing function of the smart contract, so as to extract the complete program segment comprises the following steps:
   performing a syntax analysis of the smart contract and establishing a syntax tree;
   creating a Solidity system dependency diagram according to the syntax tree; and
   segmenting the Solidity system dependency diagram using a segmenting algorithm to extract the complete program segment.

3. The smart contract processing method of claim 1, wherein the establishing a symbol calculation model according to the program segment comprises:
   converting the program segment into an execution code program for an EVM according to a compilation principle of a Solidity compiler;
   converting the execution code program into a symbol calculation expression for GAS accumulation according to the GAS consumed by the execution code program and a GAS size comparison table, and generating a cycle invariant; and
   generating the cycle invariant automatically for a case that the execution code program contains a polynomial cycle, and manually assisting in adding a cycle invariant for a case that the execution code program contains a non-linear cycle.

4. The smart contract processing method of claim 3, wherein the acquiring the GAS consumption formula according to the symbol calculation model, simplifying and outputting same comprises:
   for a case that the execution code program contains a cycle, expressing a cycle assignment statement as a system of first order constant coefficient difference equations for a program variable with respect to a number of cycles, obtaining a closed form solution of the system of first order constant coefficient difference equations, substituting the closed form solution into a cycle condition, and obtaining an expression for the calculation of cycle GAS consumption with respect to the number of cycles;
   for a case that the execution code program contains logical control, converting a logical control statement into a homogeneous polynomial containing symbols of relevant variables as a GAS consumption expression; and
   accumulating in turn all GAS consumption expressions in all program segments according to a symbol calculation method to acquire a final GAS consumption formula, and simplifying and outputting the GAS consumption formula.

5. The smart contract processing method of claim 4, wherein the symbol calculation method comprises the following steps:
   inputting a polynomial cycle program P, a number m of program variables, and an upper bound U on a number of power of polynomial invariants;
   initializing LoopInv to be empty;
   representing the polynomial cycle program P by a polynomial variation system T, wherein T consists of V, L, Y, l0 and O, V represents a set of variables, L represents a set of finite positions, Y represents a set of state variations, l0 represents an initial position, and O represents an initial condition;
   acquiring a set S of sample points according to the polynomial variation system T;
   calculating, by means of a BM algorithm, a Grobner basis $I(S)=<p1, p2, \ldots, ps>$ of the set S of sample points with elimination ideal under a subdivision dictionary order, and calculating the lowest number of all polynomials $p1, p2, \ldots, ps$ in $I(S)$ with $pi=0$ as a candidate invariant of the polynomial cycle program P, wherein $i=1, 2, \ldots, s$;
   verifying the candidate invariant: when $pi(V)|pi(V')$ is set up, assigning the LoopInv to LoopInv^pi, wherein V' represents the set of variables after the variation; and
   repeating the step of verifying the candidate invariant, iterating over values of i until $i>s$, and generating a cycle invariant of the polynomial cycle program P according to the LoopInv.

6. A smart contract processing system, comprising:
   means for acquiring a smart contract, segmenting a performance analyzing function of the smart contract, so as to extract a complete program segment;
   means for establishing a symbol calculation model according to the program segment; and
   means for acquiring a GAS consumption formula according to the symbol calculation model, simplifying and outputting same.

7. A computer device, comprising a processor and a memory that stores a computer program, the computer program being executed by the processor to implement the steps of the smart contract processing method of claim 1.

8. A readable storage medium having stored a computer program, wherein the computer program is executed by a processor to implement the steps of the smart contract processing method of claim 1.

9. A static analysis method for performance of a Solidity smart contract, comprising the following steps:
   (1) inputting a Solidity smart contract, and segmenting a performance analyzing function of the Solidity smart contract, so as to extract a complete program segment;
   (2) establishing a symbol calculation model according to the complete program segment in step (1); and
   (3) calculating a GAS consumption formula according to the symbol calculation model in step (2), and outputting a simplified GAS formula.

10. The static analysis method for performance of the Solidity smart contract of claim 9, wherein the step (1) further comprises the following sub-steps:
    (1.1) performing a syntax analysis of the input Solidity smart contract and establishing a syntax tree;
    (1.2) creating a Solidity system dependency diagram according to the syntax tree; and
    (1.3) segmenting the Solidity system dependency diagram using a segmenting algorithm to extract the complete program segment.

11. The static analysis method for performance of the Solidity smart contract of claim 9, wherein the step (2) is specified as follows:
- (2.1) converting the complete program segment into an execution code (or an assembly instruction) program for an EVM according to a compilation principle of a Solidity compiler; and
- (2.2) converting the execution code program into a symbol calculation expression for GAS accumulation according to a GAS size comparison table consumed by the execution code program, and generating a cycle invariant; generating the cycle invariant automatically for a case that the execution code program contains a polynomial cycle, and manually assisting in adding a cycle invariant for a case that the execution code program contains a non-linear cycle.

12. The static analysis method for performance of the Solidity smart contract of claim 11, wherein the step (3) is specified as follows:
- (3.1) for a case that the execution code program contains a cycle, expressing a cycle assignment statement as a system of first order constant coefficient difference equations for a program variable with respect to a number of cycles, obtaining a closed form solution of the system of first order constant coefficient difference equations, substituting the closed form solution into a cycle condition, and obtaining an expression for the calculation of cycle GAS consumption with respect to the number of cycles; for a case that the execution code program contains logical control, converting a logical control statement into a homogeneous polynomial containing symbols of relevant variables as a GAS consumption expression; and
- (3.2) accumulating in turn all GAS consumption expressions in all program segments according to a symbol calculation method to acquire a final GAS consumption formula, and outputting a simplified GAS formula.

13. The static analysis method for performance of the Solidity smart contract of claim 12, wherein the symbol calculation method is specified as follows:
- (4.1) inputting a polynomial cycle program P, a number m of program variables, and an upper bound U on a number of power of polynomial invariants;
- (4.2) initializing LoopInv to be empty;
- (4.3) representing the polynomial cycle program P by a polynomial variation system T, wherein T consists of V, L, Y, l0 and O, V represents a set of variables, L represents a set of finite positions, Y represents a set of state variations, l0 represents an initial position, and O represents an initial condition;
- (4.4) acquiring a set S of sample points according to the polynomial cycle program P in step (4.3);
- (4.5) calculating, by means of a BM algorithm, a Grobner basis $I(S)=<p1, p2, \ldots, ps>$ of the set S of sample points with elimination ideal under a subdivision dictionary order, and calculating the lowest number of all polynomials p1, p2, . . . , ps in I(S) with pi=0 as a candidate invariant of the polynomial cycle program P, wherein i=1, 2, . . . , s;
- (4.6) verifying the candidate invariant: when pi(V)|pi(V') is set up, assigning the LoopInv to LoopInv^pi, wherein V' represents the set of variables after the variation; and
- (4.7) repeating the step (4.6) until i>s, and generating a cycle invariant of the polynomial cycle program P.

14. The computer device of claim 7, wherein the segmenting the performance analyzing function of the smart contract, so as to extract the complete program segment comprises the following steps:
- performing a syntax analysis of the smart contract and establishing a syntax tree;
- creating a Solidity system dependency diagram according to the syntax tree; and
- segmenting the Solidity system dependency diagram using a segmenting algorithm to extract the complete program segment.

15. The computer device of claim 7, wherein the establishing a symbol calculation model according to the program segment comprises:
- converting the program segment into an execution code program for an EVM according to a compilation principle of a Solidity compiler;
- converting the execution code program into a symbol calculation expression for GAS accumulation according to the GAS consumed by the execution code program and a GAS size comparison table, and generating a cycle invariant; and
- generating the cycle invariant automatically for a case that the execution code program contains a polynomial cycle, and manually assisting in adding a cycle invariant for a case that the execution code program contains a non-linear cycle.

16. The computer device of claim 15, wherein the acquiring the GAS consumption formula according to the symbol calculation model, simplifying and outputting same comprises:
- for a case that the execution code program contains a cycle, expressing a cycle assignment statement as a system of first order constant coefficient difference equations for a program variable with respect to a number of cycles, obtaining a closed form solution of the system of first order constant coefficient difference equations, substituting the closed form solution into a cycle condition, and obtaining an expression for the calculation of cycle GAS consumption with respect to the number of cycles;
- for a case that the execution code program contains logical control, converting a logical control statement into a homogeneous polynomial containing symbols of relevant variables as a GAS consumption expression; and
- accumulating in turn all GAS consumption expressions in all program segments according to a symbol calculation method to acquire a final GAS consumption formula, and simplifying and outputting the GAS consumption formula.

17. The computer device of claim 16, wherein the symbol calculation method comprises the following steps:
- inputting a polynomial cycle program P, a number m of program variables, and an upper bound U on a number of power of polynomial invariants;
- initializing LoopInv to be empty;
- representing the polynomial cycle program P by a polynomial variation system T, wherein T consists of V, L, Y, l0 and O, V represents a set of variables, L represents a set of finite positions, Y represents a set of state variations, l0 represents an initial position, and O represents an initial condition;
- acquiring a set S of sample points according to the polynomial variation system T;
- calculating, by means of a BM algorithm, a Grobner basis $I(S)=<p1, p2, \ldots, ps>$ of the set S of sample points with elimination ideal under a subdivision dictionary order, and calculating the lowest number of all polynomials p1, p2, ..., ps in I(S) with pi=0 as a candidate invariant of the polynomial cycle program P, wherein i=1, 2, ..., s;

verifying the candidate invariant: when pi(V)|pi(V') is set up, assigning the LoopInv to LoopInv^pi, wherein V' represents the set of variables after the variation; and repeating the step of verifying the candidate invariant, iterating over values of i until i>s, and generating a cycle invariant of the polynomial cycle program P according to the LoopInv.

18. The readable storage medium of claim 8, wherein the segmenting the performance analyzing function of the smart contract, so as to extract the complete program segment comprises the following steps:

performing a syntax analysis of the smart contract and establishing a syntax tree;

creating a Solidity system dependency diagram according to the syntax tree; and segmenting the Solidity system dependency diagram using a segmenting algorithm to extract the complete program segment.

19. The readable storage medium of claim 8, wherein the establishing a symbol calculation model according to the program segment comprises:

converting the program segment into an execution code program for an EVM according to a compilation principle of a Solidity compiler;

converting the execution code program into a symbol calculation expression for GAS accumulation according to the GAS consumed by the execution code program and a GAS size comparison table, and generating a cycle invariant; and generating the cycle invariant automatically for a case that the execution code program contains a polynomial cycle, and manually assisting in adding a cycle invariant for a case that the execution code program contains a non-linear cycle.

20. The readable storage medium of claim 19, wherein the acquiring the GAS consumption formula according to the symbol calculation model, simplifying and outputting same comprises:

for a case that the execution code program contains a cycle, expressing a cycle assignment statement as a system of first order constant coefficient difference equations for a program variable with respect to a number of cycles, obtaining a closed form solution of the system of first order constant coefficient difference equations, substituting the closed form solution into a cycle condition, and obtaining an expression for the calculation of cycle GAS consumption with respect to the number of cycles;

for a case that the execution code program contains logical control, converting a logical control statement into a homogeneous polynomial containing symbols of relevant variables as a GAS consumption expression; and accumulating in turn all GAS consumption expressions in all program segments according to a symbol calculation method to acquire a final GAS consumption formula, and simplifying and outputting the GAS consumption formula.

* * * * *